US008241727B2

(12) United States Patent
Nelson

(10) Patent No.: US 8,241,727 B2
(45) Date of Patent: Aug. 14, 2012

(54) METHOD OF PRODUCING SOLID DECORATED GRAPHIC ARTS OBJECTS

(75) Inventor: Gunnard Nelson, Stilwell, KS (US)

(73) Assignee: Barton Nelson, Inc., Kansas City, MO (US)

( * ) Notice: Subject to any disclaimer, the term of this patent is extended or adjusted under 35 U.S.C. 154(b) by 0 days.

(21) Appl. No.: 13/088,984

(22) Filed: Apr. 18, 2011

(65) Prior Publication Data

US 2011/0195234 A1 Aug. 11, 2011

Related U.S. Application Data

(62) Division of application No. 12/233,866, filed on Sep. 19, 2008.

(51) Int. Cl.
*B32B 3/30* (2006.01)

(52) U.S. Cl. .... 428/121; 428/13; 428/195.1; 40/124.14; 40/786; 40/774; 40/771; 40/737

(58) Field of Classification Search .................. 428/121, 428/13, 195.1; 40/124.14, 786, 774, 771, 40/737
See application file for complete search history.

(56) References Cited

U.S. PATENT DOCUMENTS 6,099,928 A * 8/2000 Chee ............................ 428/40.1

* cited by examiner

*Primary Examiner* — William P Watkins, III
(74) *Attorney, Agent, or Firm* — Hovey Williams LLP

(57) ABSTRACT

Decorated three-dimensional articles (64, 78, 82, 86) may be produced having wall structure (66-72) with distortion-free images (40*a*, 40*b*) appearing through the inner and outer surfaces of the wall structure (66-72). Preferably, a sheet of paper stock (38) is imprinted on both faces with mirror images (40*a*, 40*b*), and the stock (38) is applied to a light-transmitting substrate (44) so that the image (40*b*) appears through the substrate (44), thereby yielding a blank (50). A plurality of lines of weakness (54) are formed in the blank (50) by laser ablation extending through the image (40*a*) and stock (38), but not through the image (40*b*), in order to define spaced apart bend areas (56). The substrate (44) is then heated along the bend areas (56), and the blank (50) is formed about a mandrel (62). If desired, the formed blank (50) may be completed by addition of a base (74). The invention can be used for the economical production of a virtually limitless number of three-dimensional articles, even with one-off unique articles or short runs of articles.

20 Claims, 4 Drawing Sheets

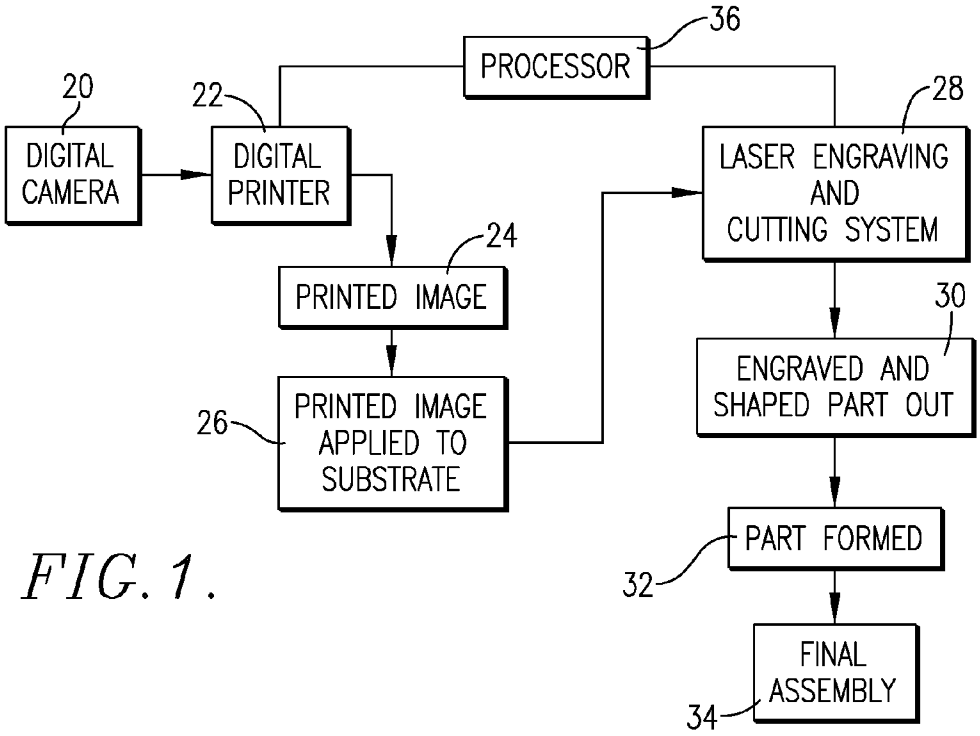
FIG. 1.
FIG. 2.
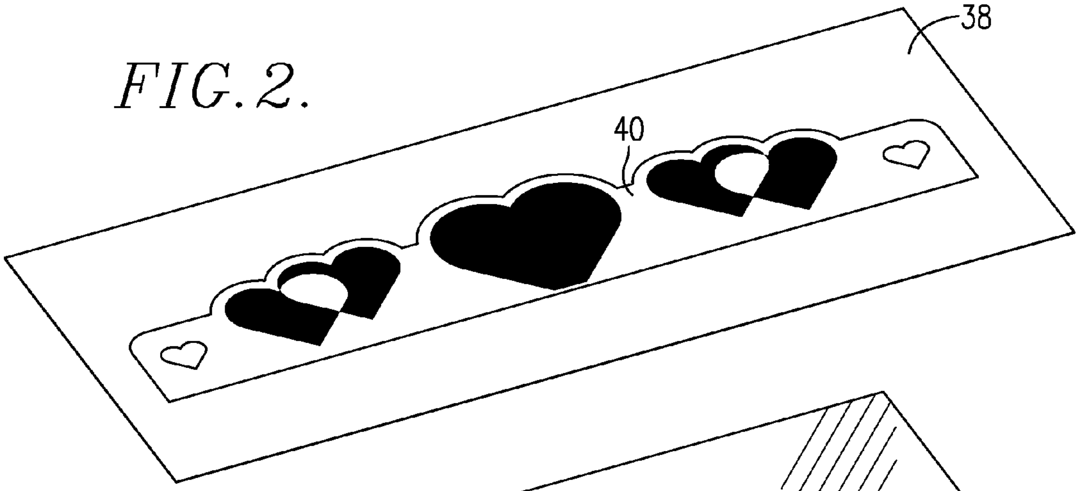
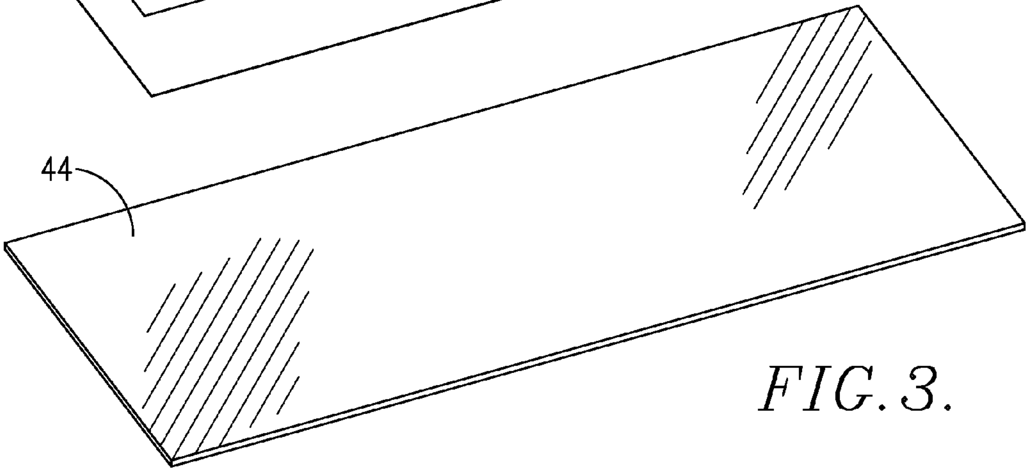
FIG. 3.

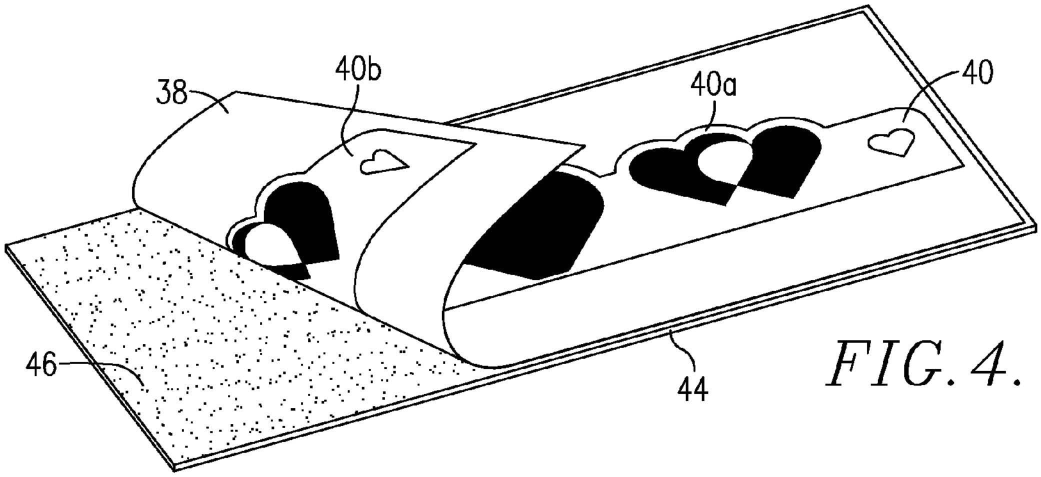
FIG. 4.
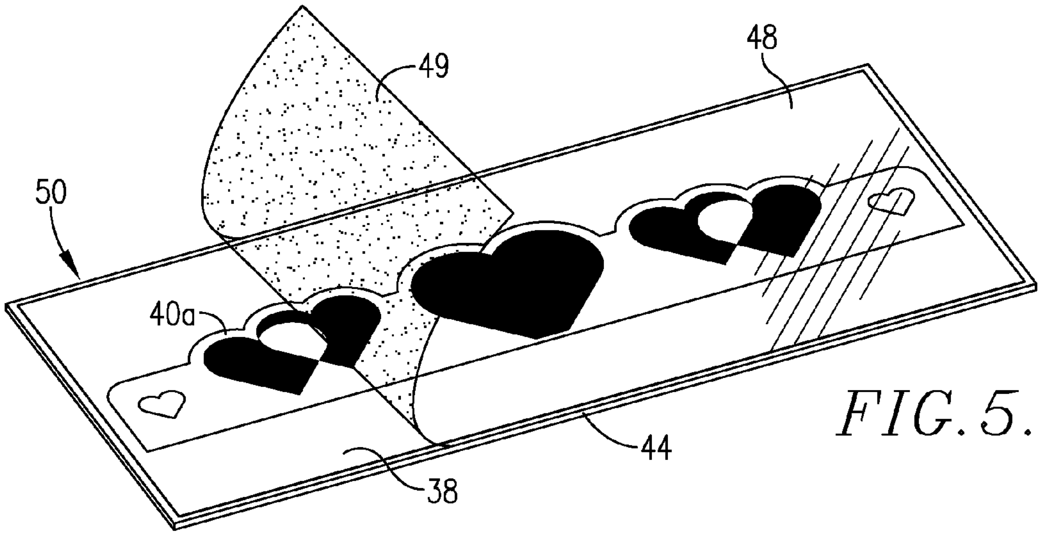
FIG. 5.
FIG. 6.
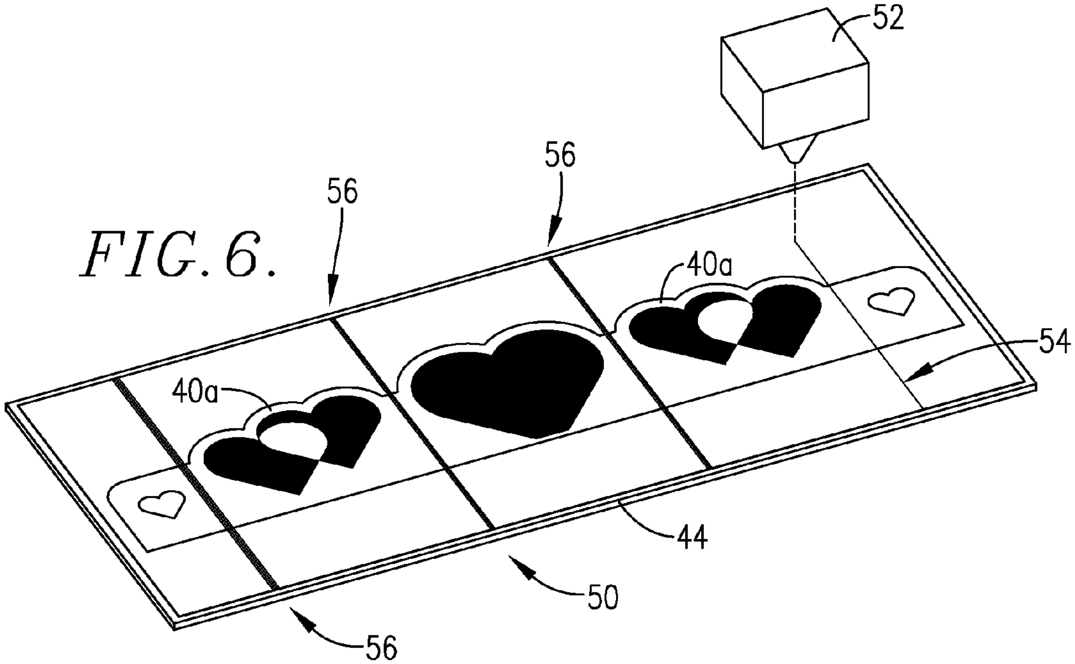

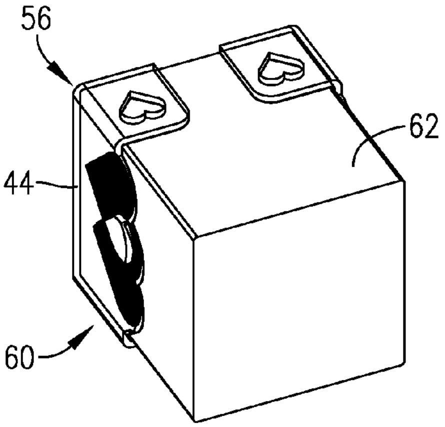
FIG. 11.
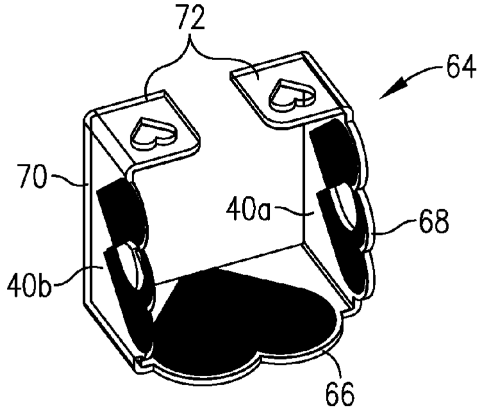
FIG. 12.
FIG. 13.
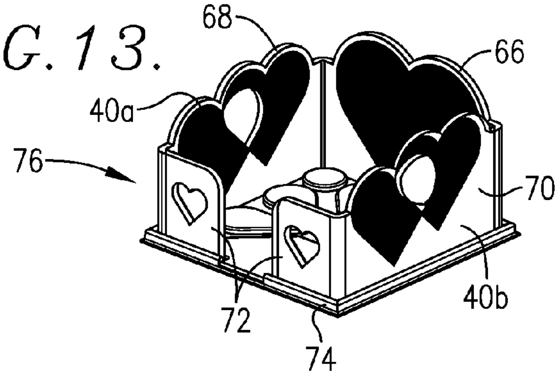
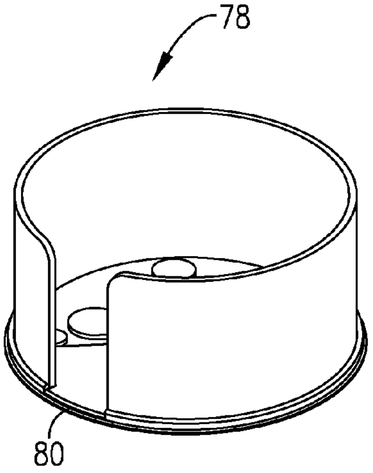
FIG. 14.
FIG. 16.
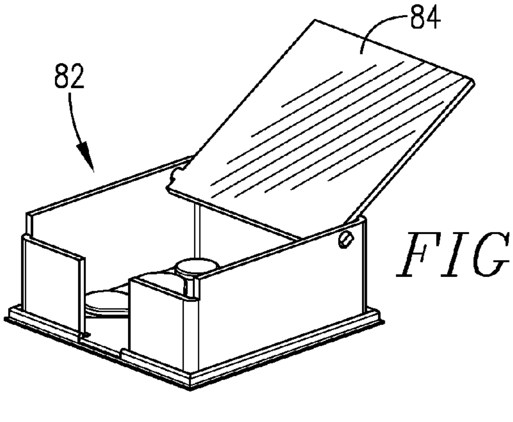
FIG. 15.
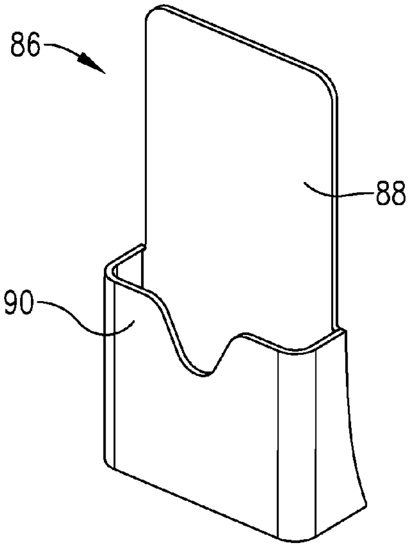

METHOD OF PRODUCING SOLID DECORATED GRAPHIC ARTS OBJECTS

CROSS-REFERENCE TO RELATED APPLICATION

This is a division of U.S. patent application Ser. No. 12/233,866, filed Sep. 19, 2008, which is incorporated by reference herein in its entirety.

BACKGROUND OF THE INVENTION

1. Field of the Invention

The present invention is broadly concerned with three-dimensional decorated articles which can be rapidly and economically produced as unique articles or in short-run situations. More particularly, the invention is concerned with such articles, as well as blanks used in the production thereof and methods of production, wherein an image-imprinted sheet of stock is applied to a light-transmitting substrate so that the image appears through the substrate, and bend areas are formed by laser ablation of the stock without disturbing the image appearing through the substrate. The substrate is then heated along the bend areas and formed into a three-dimensional article.

2. Description of the Prior Art

Decorated three-dimensional articles such as holders for note cubes have been provided in the past. These are generally formed of synthetic resin material and include a base with upstanding attached sidewalls defining an enclosure for receiving the note cubes. It has also been known to provide advertising material or other images of the exterior faces of the sidewalls. Prior production methods used to fabricate these three-dimensional articles have dictated that only large runs are cost effective. That is, one-off unique or short-run products simply cannot be produced economically by these prior methods.

U.S. Pat. Nos. 6,402,878 and 6,395,125 describe processes of creation of picture frames having photographs or other picture art surrounding a picture-receiving area. In the process, the border art and registration marks are printed on sheet material such as paper and a laser is used to cut around the artwork. The sheet material is then attached to a transparent polymer sheet and laser cut along a marked path. The transparent polymer sheet is then heated and shaped to form a backing for the picture frame.

U.S. Pat. No. 6,860,045 describes a method for producing flat articles such as name badges or luggage tags. In this method, a laminated sheet is created by face-mounting of a color graphic print to an acrylic sheet using optically clear adhesive. The laminated sheet is then divided into discrete items.

Other representative graphic art processes are described in the following references: U.S. Pat. Nos. 4,371,575; 5,935,355; 6,505,738; 6,656,309; 6,780,273; 6,875,302; US Published Patent Applications Nos. 2004/0200182; 2007/0266646; Foreign Patent Publications Nos. EP 302840; JP 62178324; WO 2004039607; WO 8911681; WO 9625332 and Web-Published Literature: Memo Block Holders from Silent Kite Limited, http://www.silentkite.co.uk/subcat.asp?category=Paper+Pads,+Blocks+and+Holders&subcat=Memo+Block+Holders; Promotional Memo Holders, http://www.ideasbynet.com/promotional_memo_holders.htm; Promotional Merchandising Sourcing, http://randr.sourcinguniverse.com/gb/search.aspx?stype=ks&strsearch=memo%20pad%20paper; Promotional Printed Note Cubes in a Box, http://www.odee-company.net/promotional-products/printed-note-cubes-in-box.php.

SUMMARY OF THE INVENTION

The present invention overcomes the problems outlined above and provides aesthetically pleasing, low-cost three-dimensional articles. Broadly, the three-dimensional articles of the invention include wall structure formed of light-transmitting synthetic resin material and having an inner surface and an outer surface, and a sheet of stock bearing an imprinted image on at least one face thereof, the sheet of stock secured to the inner surface of the wall structure with the image adjacent the wall structure and appearing through the wall structure. The wall structure is bent about a plurality of bend areas, with each of the bend areas defined by at least one line of weakness formed along the face of the sheet of stock remote from the wall structure.

In preferred forms, the image is imprinted onto both faces of the stock as mirror images of each other, the line of weakness extends through the image remote from the wall structure, and preferably through the stock. However, the line of weakness does not extend through or disturb the image adjacent the wall structure. Moreover, each of the bend areas is preferably defined by a plurality of closely spaced lines of weakness.

The preferred method of the invention comprises the steps of providing a composite blank including a substrate having opposed surfaces and formed of a light-transmitting synthetic resin material, with an image-imprinted sheet of stock affixed to one face of the substrate so that the image is visible through the substrate. Next, at least one line of weakness is formed on the surface of the stock remote from the image to define a bend area. The composite is then heated at least along the bend area and is folded about a forming mandrel, with the line of weakness adjacent the mandrel. This provides a decorated three-dimensional article, with the bend area accommodating the folding, and with the image appearing distortion-free through the substrate. Preferably, the opposed faces of the sheet of stock are imprinted with registered mirror images, and the line of weakness extends through the image remote from the substrate and through the stock, but not through the image adjacent the substrate. In further preferred features, a transparent film is applied over the imprinted image remote from the substrate, and a plurality of lines of weakness are formed by laser ablation of the blank.

The methods of the invention can be used to provide note cube holders or other enclosures, or a variety of different decorative articles such as hat bands or novelty items.

BRIEF DESCRIPTION OF THE DRAWINGS

FIG. 1 is a schematic block diagram illustrating the steps of the preferred method of the invention;

FIG. 2 is a perspective view of a digitally printed sheet having an image imprinted on one face of the sheet, with the opposed face having a mirror of the image;

FIG. 3 is a perspective view of the preferred transparent acrylic substrate used in the preferred process;

FIG. 4 is a perspective view illustrating application of the sheet of FIG. 2 onto one face of the substrate of FIG. 3;

FIG. 5 is a perspective view similar to that of FIG. 4, but illustrating application of a transparent film over the imprinted sheet of FIG. 4 to provide a composite blank;

FIG. 6 is a perspective view illustrating the preferred process of raster scanning the blank of FIG. 5 using a laser, to form ablated lines of weakness;

FIG. 11 is a perspective view illustrating the forming of the laser-cut composite blank about the mandrel;

FIG. 12 is a perspective view of the formed article produced by the FIG. 11 step;

FIG. 13 is a perspective view of a completed note holder article using the formed article of FIG. 12 with an adhesively-secured base;

FIG. 14 is a perspective view of round article which can be produced in accordance with invention;

FIG. 15 is a perspective view of another type of note holder article which can be produced in accordance with the invention; and FIG. 16 is a perspective view of article which can be produced in accordance with the invention.

DETAILED DESCRIPTION OF THE PREFERRED EMBODIMENT

Figure 7:
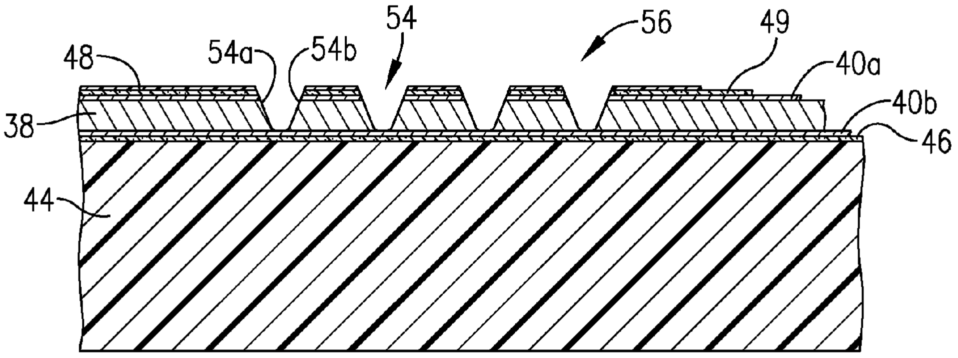
FIG. 7 is a greatly enlarged, fragmentary vertical section depicting the lasered raster lines of FIG. 6.

The present invention provides a method of producing three-dimensional graphic arts articles of varying styles and configurations. As used herein a "three-dimensional article" refers to an article of folded design and presenting wall sections of substantial width, usually many times the thickness of the walls, and preferably at least about four times the wall thickness. Such three-dimensional articles are thus distinct from conventional flat articles which do not have a bent or folded configuration. The three-dimensional articles of the invention may be fabricated for a variety of end uses, for example as holders for cubes of note paper.

The preferred steps in the method are schematically illustrated in FIG. 1 and comprise an initial step 20 where a digital image is captured and printed onto both faces of a suitable stock using a digital printer, step 22, to yield the printed sheet, as at 24. The printed image is then applied to a substrate as in step 26. The resulting blank is then laser engraved and cut, step 28, to create a finished blank as at 30 having a desired configuration and one or more lines of weakness which define fold areas in the blank. The blank is then shaped using a mandrel or the like to create a formed part as at 32. Final assembly may involve attachment of a base or cover as desired, step 34. The digital printing and laser engraving/cutting steps are controlled by a computer 36 or other suitable digital processor.

The presently preferred method steps are illustrated in FIGS. 2-13. In the first step, a stock 38 having a printed image 40 thereon is provided, as in steps 22 and 24. In preferred forms, the stock 38 is standard enamel-coated paper stock used in the graphic arts industry. The image 40 is imprinted onto both faces of the stock 38 to provide fully registered, outer and inner mirror images 40*a* and 40*b*. The image 40 may be of virtually any type, such as personal photographs or advertising. In practice, a customer may send a digital image over the internet or otherwise deliver it to a production facility. At this point, the facility's art department would upload the image, and make any correction or additions requested by the customer. Also, if the design dictates, the art department may incorporate a peripheral cut line or pattern about the image 40, and such information is stored in computer 36.

In the next step (FIGS. 3-4), the imprinted stock 38 is applied to a light-transmitting substrate 44. The substrate 44 is preferably substantially transparent, but may be translucent if desired. Also, the substrate could be formed of lenticular material. In any case, the image 40*b* adjacent the substrate 44 is visible through the substrate. As illustrated in FIG. 4, an optically clear adhesive 46 can be sprayed onto the surface of substrate 44 in order to affix the imprinted stock 38 to the substrate.

In the next preferred step, a film overlay 48 is applied over the stock 38 and the outer image 40*a*. Preferably, a polyester laminate film which is light-transmitting and preferably substantially transparent, is used for this purpose. The overlay 48 is adhered to the stock 38 by means of conventional adhesive 49. This provides a completed product blank 50 suitable for further processing as will be described.

Specifically, the laminate-coated face of blank 50 is processed using a laser engraving and cutting system 52 controlled by computer 36. This involves forming a plurality of lines of weakness 54 by laser ablation of the blank 50, the lines 54 extending at least partially through the outer image 40*a* and stock 38. However, the lines of weakness 54 could also be formed by die cutting or other conventional techniques. As best seen in FIG. 7, the individual lines of weakness 54 preferably extend through the film 48, adhesive 49, outer image 40*a*, and stock 38. However, as shown, these lines of weakness do not extend through inner image 40*b*, adhesive 46, or substrate 44. The preferred laser ablation technique creates line of weakness 54 of truncated V-shape cross section, defined by opposed, converging walls 54*a*, 54*b*.

It will also be observed that a plurality of closely spaced lines of weakness 54 constitute a bend area 56, and that the bend areas 56 are laterally a substantial distance. Preferably, each line of weakness 54 has a maximum width of from about 0.005-0.05 inches, and more preferably 0.01 inches. The closely-spaced lines of weakness 54 making up each bend area 56 are spaced apart a distance of from about 0.005-0.10 inches, more preferable from about 0.01 inches. In some instances the number of lines of weaknesses for given bend areas may change, as well as the close spacing between the lines of weakness. In the depicted embodiment for example, the endmost bend areas are defined by lines of weakness spaced apart a distance somewhat greater than the lines of weakness defining the inner bend areas.

Figure 8:
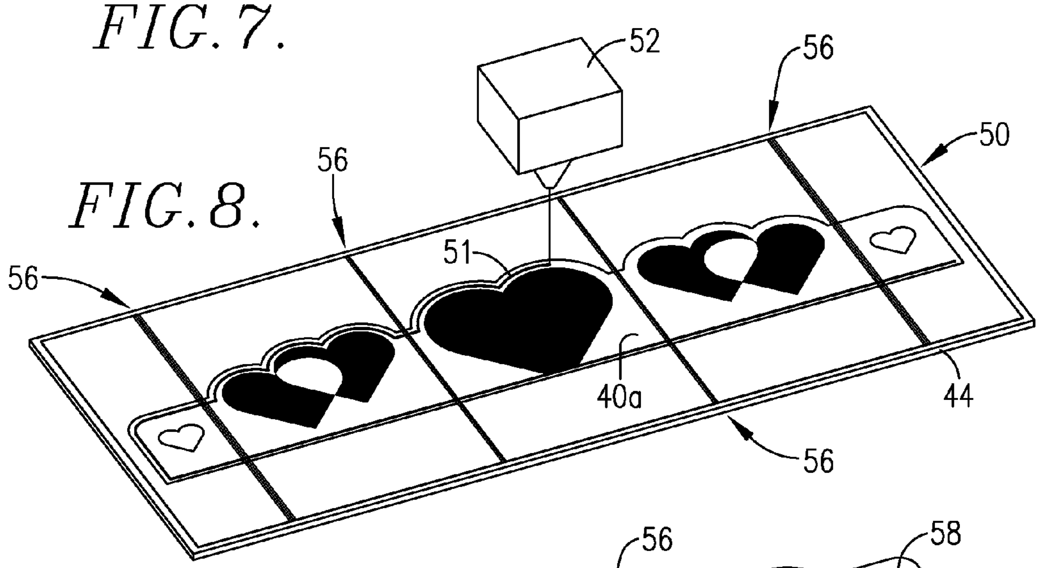
FIG. 8 is a perspective view similar to that of FIG. 6, but illustrating use of a laser to cut the composite blank around the imprinted image.
Figure 9:
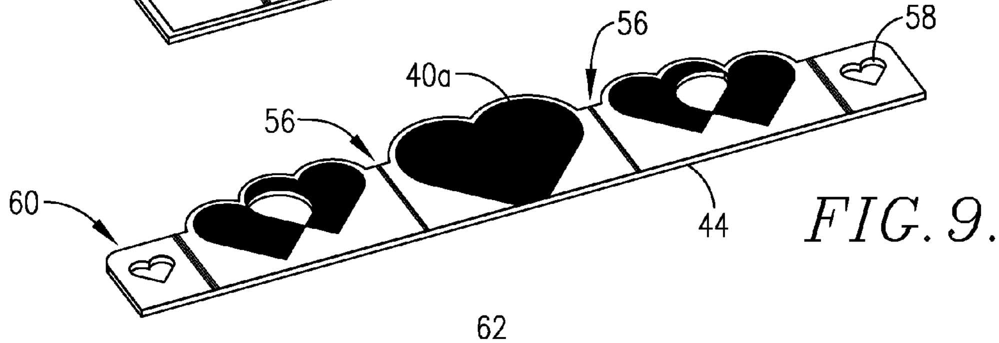
FIG. 9 is a perspective view illustrating the laser-cut composite blank from the FIG. 8 step.
Figure 10:
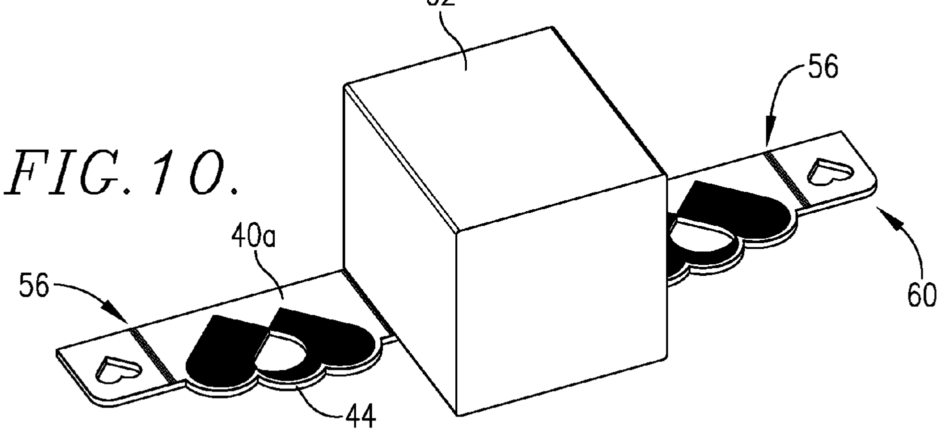
FIG. 10 is a perspective view illustrating placement of the laser-cut composite blank of FIG. 9 adjacent a forming mandrel.

As a part of the laser processing of blank 50, the blank 50 may be cut along the previously described peripheral cut line as illustrated in FIG. 8, at 51. Additionally, if the design dictates, cut out areas 58 may be formed in the blank. This results in a final part 60 (FIG. 9) ready for further processing.

In the next step, the part 60 is heated to facilitate bending and forming thereof. Again, the type and extent of heating is largely dictated by design considerations. In the example illustrated, the part 60 may be heated using elongated resistance heating elements (not shown) positioned adjacent the substrate 44 at zones corresponding to the bend areas 56. Alternately, the entire part 60 may be heated. In typical situations, heating to a temperature of from about 350-500° F. for a period of about 10-60 seconds, more preferably about 30 seconds, is adequate.

The heated part 60 is next formed using an appropriate mandrel 62. In this case a square mandrel 62 is employed and is placed between a pair of adjacent bend areas 56, with the side margins of the mandrel 62 closely adjacent such bend areas. The part 60 is then folded about the fold areas 56 into conforming relationship with mandrel 62 (FIG. 11) and allowed to cool. This yields a formed part 64 (FIG. 12) which in this embodiment is in the form of an enclosure of quadrate (square) plan configuration, including back wall 66, opposed sidewalls 68 and 70, and front walls 72. It will be seen that the inner surfaces of the walls 66-72 are decorated with image 40*a*, whereas the outer surfaces are decorated with mirror image 40*b*, visible through the light-transmitting substrate 44. A base 74 (FIG. 13) may then be adhesively secured to the bottom edges of the walls 66-72 to complete the three-dimensional object 76.

The object 76 is specifically designed as a holder for a cube of note sheets (not shown), such as Post-It® adhesive sheets. However, the invention is broadly applicable to a virtually limitless number of three-dimensional objects. FIG. 14-16 illustrate other examples, such as a round circular article 78 with an attached lower base 80 (FIG. 14); a square sheet holder article 82 similar to article 76 but having a pivotal cover 84 (FIG. 15); and a surface mount article 86 having a back wall 88 and pocket-defining wall structure 90 extending forwardly from back wall 88. The invention is also not limited to various types of holders. Thus, decorated hat bands or children's crowns and tiaras can also be produced.

A significant feature of the invention is the ability to economically produce one-off unique or short-run articles. Thus, a customer may send a group photograph to the production facility, and the method described above may be employed to create a unique note holder or other article using the uploaded photograph. This could be done at a very low cost and profitably sold at a commercially viable price. In a fully automated system of the type described herein, as many as 500 one-off individually unique articles may be produced per hour with a minimum of labor.

In addition, provision of the stock 38 printed on both faces, with the lines of weakness extending through the stock but not through the image 40*b* adjacent the substrate, permits complex three-dimensional articles to be produced without distortion of the image 40*b*. The mirror image 40*a*, visible along the inner surfaces of the wall structure of the finished article is also substantially distortion-free. Thus, an aesthetically pleasing three-dimensional article can be produced.

I claim:

1. A blank for producing a decorated three-dimensional article, said blank comprising:

a substantially flat substrate formed of light-transmitting synthetic resin material having a thickness and presenting a pair of opposed faces;

a sheet of stock having a thickness and secured to one face of said substrate, said sheet of stock having image portions imprinted thereon, with the image portions appearing through the thickness of said substrate, the thickness of said substrate being substantially greater than the thickness of said stock; and at least one laser-cut line of weakness on the surface of said stock remote from said image portions to define a bend area, said line of weakness located such that certain image portions lie on opposite sides of the line of weakness, so that bending of the substrate and stock about said bend area causes said certain image portions to lie in different planes.

2. The blank of claim 1, said image portions being a part of a single, continuous image panel.

3. The blank of claim 2, said stock including opposed faces, said single image panel being imprinted onto both faces of said stock as mirror images of each other, said line of weakness extending through the imprinted single image panel remote from said substrate.

4. The blank of claim 1, said stock being formed of paper.

5. The blank of claim 1, said stock adhesively secured to said substrate.

6. The blank of claim 3, including a transparent film applied over the image remote from said substrate.

7. The blank of claim 3, each of said image panels having a thickness, said line of weakness extending through the thickness of said image panel remote from said substrate and at least a portion of said stock, but not into the image panel adjacent said substrate.

8. The blank of claim 1, including a plurality of said lines of weakness.

9. The blank of claim 8, said lines of weakness being laterally spaced apart to define a plurality of said bend areas.

10. The blank of claim 9, each of said bend areas having a plurality of closely spaced apart lines of weakness.

11. The blank of claim 10, said closely spaced apart lines of weakness being spaced a distance of from about 0.005-0.10 inches.

12. The blank of claim 11, said distance being about 0.01 inches.

13. The blank of claim 1, said line of weakness having a width of from about 0.005-0.050 inches.

14. The blank of claim 13, said line of weakness having a width of from about 0.01 inches.

15. A three-dimensional decorated article comprising:

wall structure formed of light-transmitting synthetic resin material and having a thickness, an inner surface and an outer surface; and a sheet of stock bearing imprinted image portions on at least one face thereof, said sheet of stock having a thickness and secured to said inner surface of said wall structure with said image portions adjacent the wall structure and appearing through the thickness of the wall structure;

said wall structure having a thickness substantially greater than the thickness of said stock, said wall structure bent about a plurality of bend areas, each of said bend areas defined by at least one laser-cut line of weakness formed along the face of said sheet of stock remote from said wall structure, said line of weakness located such that certain of said image portions lie on opposite sides of the line of weakness and in different planes.

16. The article of claim 15, said image portions being a part of a single, continuous image panel.

17. The article of claim 16, said single image panel imprinted onto both faces of said stock as mirror images of each other, said line of weakness extending through the imprinted single image panel remote from said wall structure.

18. The article of claim 17, each of said image panels having a thickness, said line of weakness extending through the thickness of said image panel remote from said substrate and at least a portion of said stock, but not into the image panel adjacent said substrate.

19. The article of claim 17, including a transparent film applied over said image portions remote from said wall structure, said lines of weakness extending through said transparent film.

20. The blank of claim 1, said substrate having a thickness greater than two times the thickness of said stock.

* * * * *